June 19, 1956 — E. WILDHABER — 2,750,814
TOOTHED GEARING

Filed Oct. 30, 1951 — 5 Sheets-Sheet 1

INVENTOR.
ERNEST WILDHABER
BY
Richard W. Treverton
ATTORNEY

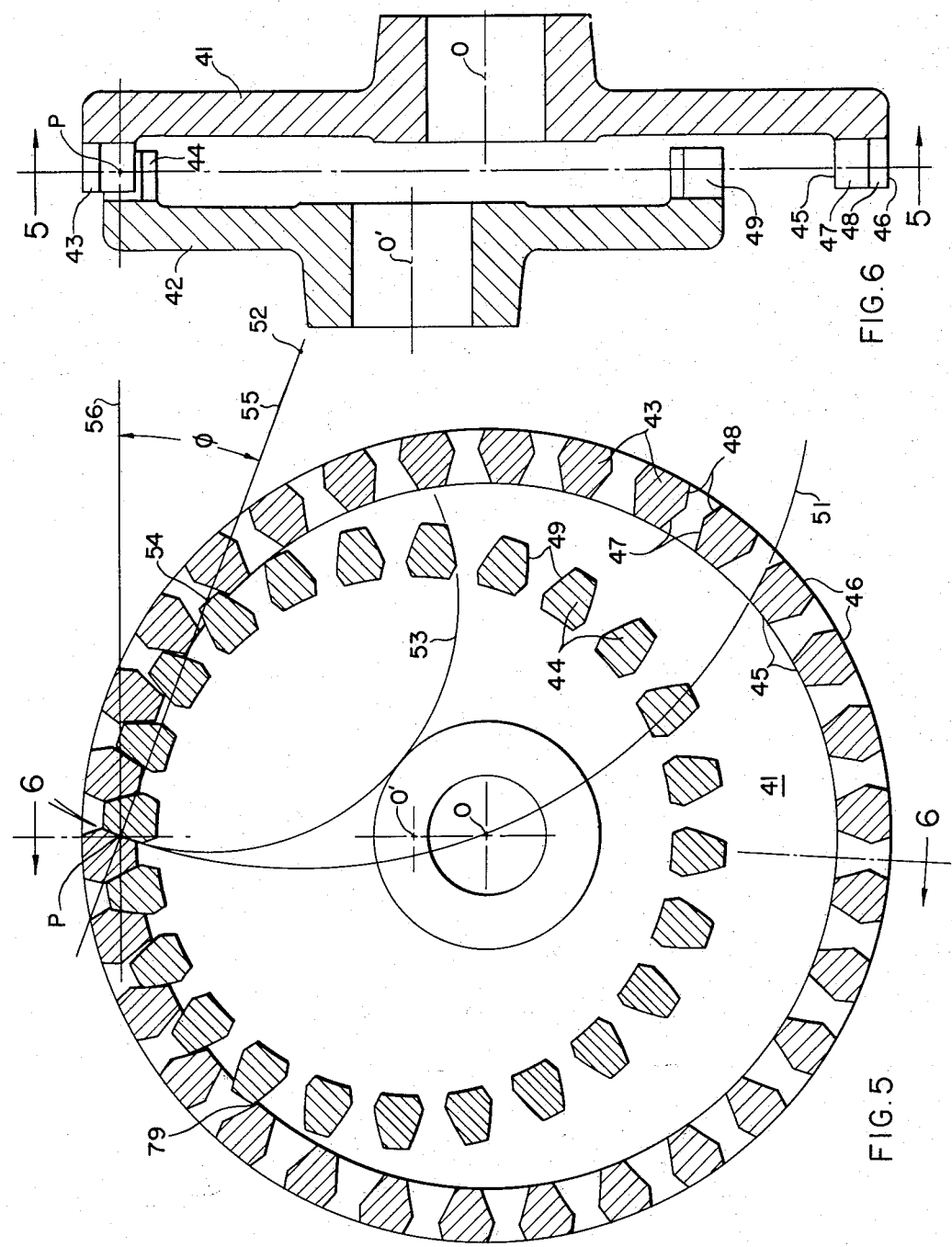

June 19, 1956  E. WILDHABER  2,750,814
TOOTHED GEARING

Filed Oct. 30, 1951  5 Sheets-Sheet 4

INVENTOR.
ERNEST WILDHABER
BY
Richard W. Treverton
ATTORNEY

June 19, 1956 — E. WILDHABER — 2,750,814
TOOTHED GEARING
Filed Oct. 30, 1951 — 5 Sheets-Sheet 5
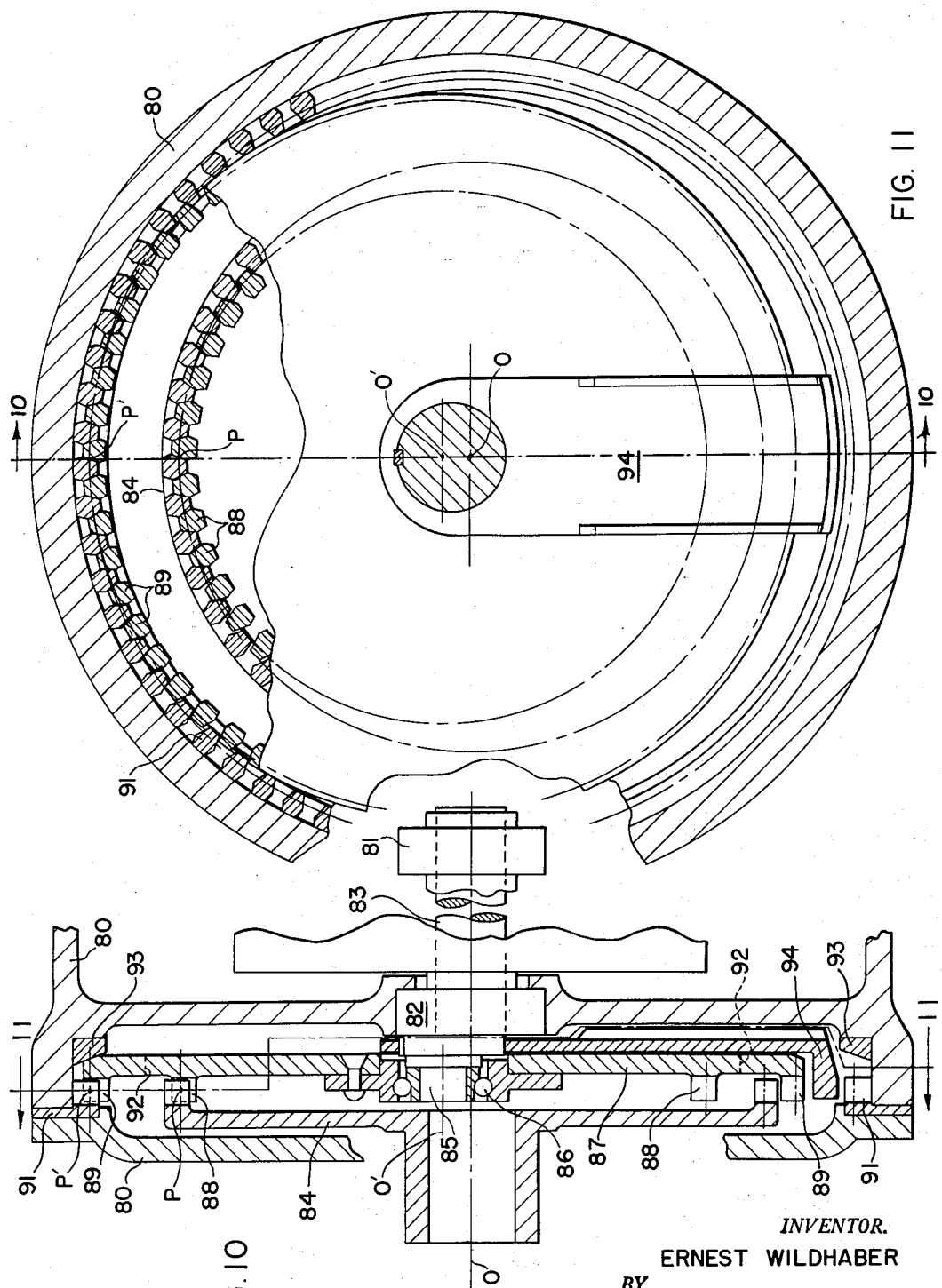
INVENTOR.
ERNEST WILDHABER
BY Richard W. Treverton
ATTORNEY

United States Patent Office 2,750,814
Patented June 19, 1956

2,750,814
TOOTHED GEARING

Ernest Wildhaber, Brighton, N. Y., assignor to The Gleason Works, Rochester, N. Y., a corporation of New York Application October 30, 1951, Serial No. 253,781

28 Claims. (Cl. 74—805)

The present invention relates to an improvement in toothed gears and to an improved gear drive employing them, especially a high reduction drive. A preferred method of making such gears is described and claimed in my divisional application Serial No. 313,383, filed October 7, 1952.

The teeth extend in an axial direction from a side face of each gear so that the tooth spaces are open on the face and also at both radial ends. In other words the teeth extend from the web or body portion of the gear, and in the case of an internal mesh gear the usual rim at the bottom of the teeth is omitted. The working profiles of the teeth are of the circular arc shape disclosed in my Patent No. 2,230,418, granted February 4, 1941. Such profiles when properly proportioned and positioned transmit motion at constant velocity ratio and when used as internal mesh gears at low ratios have somewhat less tendency to interference than the commonly used involute profiles. The teeth may be cut by a rotary cutter, preferably one that is of annular form, and is either an edged cutting tool or an abrasive grinding wheel. In such case the working faces of the teeth are produced by a side cutting profile of the cutter, this profile being preferably, but not necessarily, straight and inclined relative to the cutter axis.

In the cutting operation the axis of the gear being cut and the cutter axis are so arranged, parallel to each other, that the cutter simultaneously acts in two different tooth spaces of the gear, thereby cutting the opposite working faces of spaced teeth. The cutting operation is repeated for each tooth space of the gear, and between such operations the cutter is withdrawn and the gear indexed to bring successive tooth spaces into alignment with the cutter.

The working tooth faces preferably are conical surfaces, so that the teeth taper in an axial direction, being thickest at the web or body portion of the gear. The teeth may be strengthened further by making them substantially longer (their dimension radially of gear) than their working faces. The teeth are advantageously made of hexagonal shape in transverse section, each side of the tooth consisting of the working face and an adjacent angularly related face. This face may be cut with the same annular tool that cuts the working faces, and in the same cutting operation, but by a side cutting profile of the tool that is opposite to the side cutting profile which produces the working face. While one working face is being cut, the angularly related face of an adjacent tooth is cut.

The invention is especially advantageous as applied to internal mesh gears because their tooth profile curvature is small, so that relatively large diameter cutters are used in making them. I have discovered that internal gear tooth interference, that may be encountered when the gear ratio is low (depending upon the pressure angle and tooth length but usually at ratios of less than 2:1), is alleviated by changing the tooth proportions to make the gear addendum longer than the pinion addendum. I have also discovered that less tendency toward internal interference is encountered with circular arc tooth profiles than with involute profiles, and, hence, that for equal tooth length and pressure angle the internal gears of the present invention enable ratios closer to unity than is possible with conventional involute gears.

The gears of the present invention are well adapted to uses where a small face width is desirable, such as in the high reduction drive of the present invention. In this device a drive member and a driven sun gear are mounted for rotation about a common axis. A planet gear is rotatable on the drive member about an axis eccentric of this common axis, and has two sets of gear teeth, one which meshes with the driven gear and the other with a stationary sun gear that is preferably larger than and coaxial with the driven gear. The bearing which supports the planet gear on the eccentric portion of the drive member preferably lies in the same transverse plane as the gear teeth. The axial thrust resulting from the axially tapered form of the teeth is borne largely by the race on which the planet gear rolls. This race is stationary, and its effective diameter preferably is approximately equal to the pitch diameter of the stationary gear. The arrangement described provides a gear reduction drive having very small friction losses even at large reduction ratios, which may be in the range of about 8:1 to 100:1.

The foregoing and other objects and advantages of the invention will appear from the following description made with reference to the drawings, wherein:

Fig. 5 is a transverse section, taken along line 5—5 of Fig. 6, of an internal mesh gear and mating pinion;

Fig. 6 is an axial section taken along line 6—6 of Fig. 5;

Fig. 10 is an axial section, taken along line 10—10 of Fig. 11, through the gear reduction unit; and, Fig. 11 is a transverse section taken along line 11—11 of Fig. 10.

Figures 1, 2:
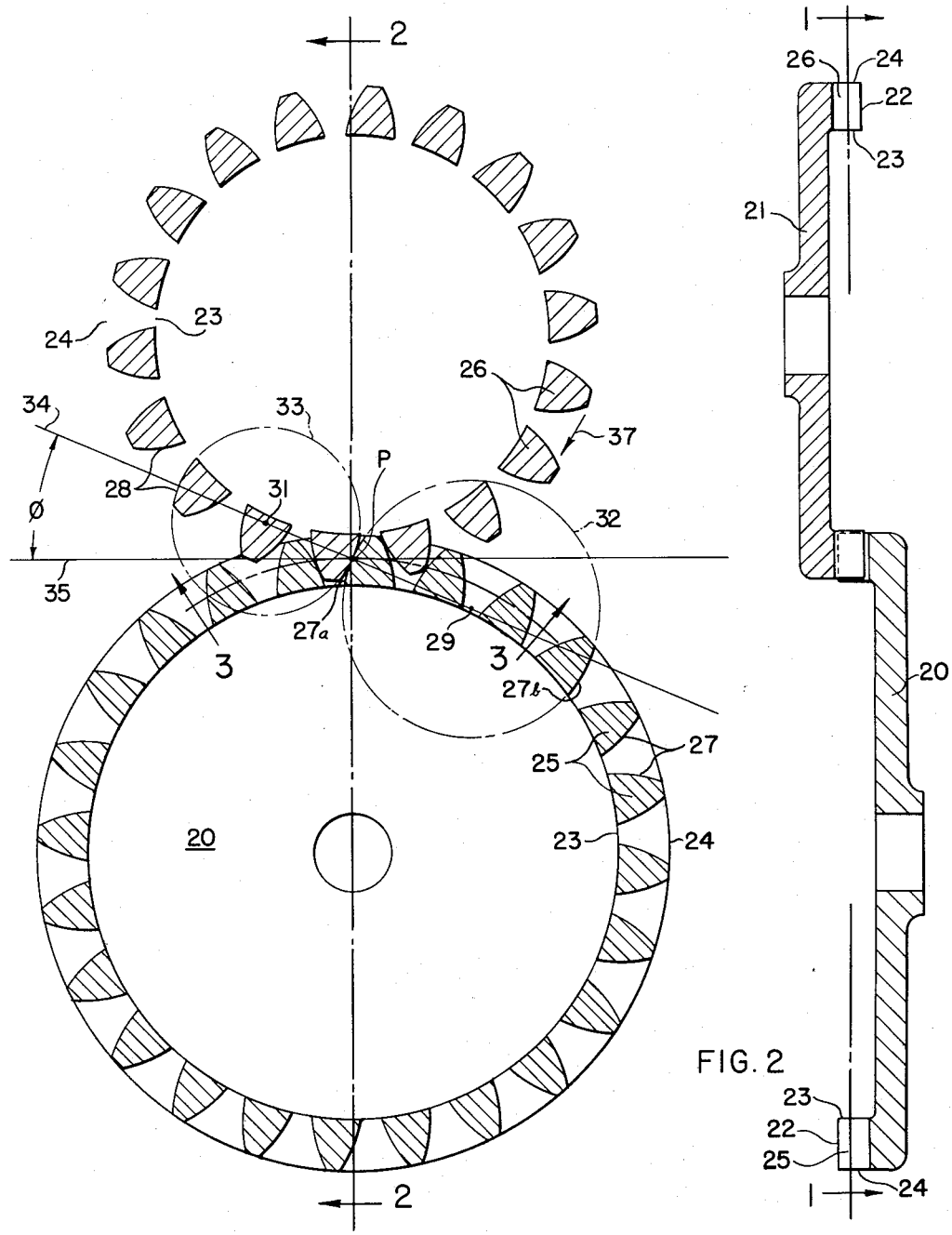
Fig. 1 is a transverse section, taken along line 1—1 of Fig. 2, through a mating pair of external gears.
Fig. 2 is an axial section taken along line 2—2 of Fig. 1.

As shown in Figs. 1 and 2 the gear 20 and pinion 21 each has its teeth extending axially from the face of its web or body portion, so that the tooth spaces are open at the face 22 and also at their inner and outer radial ends, designated 23 and 24 respectively. The gear teeth 25 and pinion teeth 26 have working profiles, designated respectively 27 and 28, that are convex circular arcs whose centers of curvature are respectively designated 29 and 31. While the gears obviously may be made by various methods, such as by cutting (including grinding) and molding methods, reference is made herein to the cutters employed in the preferred method since the geometry of the gears is closly related to that of such cutters. The cutter for the gear may rotate about center 29, with its cutting edge describing circular path 32, while the circular path 33 of the pinion cutter is about the center 31. The cutter for the gear while rotating in its path 32 simultaneously produces the opposite working faces of two spaced teeth, these being the left face 27a of one tooth and the right face 27b of a spaced tooth. The same is true of the cutter for the pinion. The axes of rotation of the cutters are parallel to the axes of the gears they cut, and, as shown, lie in a plane 34 that is disposed at the desired pressure angle $\phi$ to the pitch plane 35 and that intersects the latter along a line which contains the mean pitch point P. The correct cutter radii (the radii of circular paths 32 and 33) may be determined, as disclosed in my Patent No. 2,230,418, by the formulae:

$$C_G = \frac{3r \sin \phi}{2\frac{r}{R}+1}$$

and $$C_P = \frac{3r \sin \phi}{2+\frac{r}{R}}$$

where $C_G$ and $C_P$ are the radii of the cutters for the gear and pinion respectively, R and r the pitch radii of the gear and pinion, and $\phi$ is the pressure angle.

The radii of the cutters may be modified within reasonable limits in order that the cutters may be symmetrical with respect to the two teeth they cut simultaneously, while maintaining the cutter axes in the plane 34. Thus the radius of circular path 32 may be increased or decreased slightly, so that the path may follow both profiles 27a and 27b. This will not affect appreciably the uniform velocity ratio characteristics of the gear pair, provided that the radius of path 33 (of the pinion cutter) is correspondingly decreased or increased so that the relative curvature of the mating profiles $$\left(\frac{1}{C_G}+\frac{1}{C_P}\right)$$

is kept the same or is increased only slightly. Of course the number of teeth and the pressure angle $\phi$ may also be varied as desired in order to facilitate selection of appropriate cutter radii.

Figure 3:
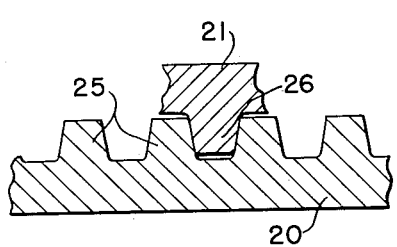
Fig. 3 is a plane development of a cylindrical section taken along line 3—3 of Fig. 1 when the gears are rotated by one-quarter pitch from the position shown in Fig. 1.
Figure 4:
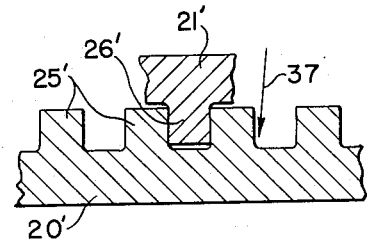
Fig. 4 is a view like Fig. 3 but illustrating an alternative form of tooth.

In Fig. 3 the teeth will be seen to taper in an axial direction, being thickest at their junctures with the gear body. Such tapering is effected by inclining the side cutting profile of the cutter to the cutter axis. Accordingly the working faces of the gears are circular conical surfaces with axes 29 and 31. Cutting is effected by feeding the rotating cutter in an axial direction with respect to the work. While the tapered tooth form of Fig. 3 is preferred because of its greater strength, other forms are possible. For example in Fig. 4 the working faces of the teeth 25' and 26' are parallel to the gear axes and hence are cylindrical surfaces. They are produced by cutters whose side cutting profiles are likewise parallel to the gear axes. Such a cutter may be fed into the work (in this instance gear 20') at a slight angle to the direction of its axis, such as in the direction of arrow 37 in Fig. 4. However with the feed at such an angle it may be necessary in some instances to cut the opposite sides of the teeth in separate operations.

In the form of the invention shown in Figs. 5 and 6 the internal mesh gear 41 has its axis at O, while the axis of the mating pinion 42 is at O'. The gear teeth 43 and also the pinion teeth 44 extend axially from their respective gear bodies. They are strengthened by being made substantially longer (their radial dimension) than their working faces, and are hexagonal in transverse cross-section, having, in addition to their two working faces and their inner and outer faces (which will usually be surfaces of revolution about the respective gear axes), two other faces each of which is disposed at an obtuse angle to the adjacent working face. The inner and outer faces of the gear teeth are designated 45 and 46, the working faces 47, and the other side faces 48. The working faces of the pinion are convex while those of the gear will usually be convex for gear-to-pinion tooth number ratios larger than 2 and concave for such ratios smaller than 2. Therefore in Fig. 5, where the tooth number ratio is 30/24 or 1.25, the working faces 47 of the gear are concave in profile.

The concave faces 47 are produced by the outside side cutting profile of a cutter rotated along path 51 about axis 52; while, as in the case of both gear members shown in Figs. 1 and 2, the convex faces 49 of pinion 42 are cut with the inside side cutting profile of a rotary cutter. This cutter rotates along path 53 about axis 54. As in the first-described embodiment the axes 52 and 54 are parallel to the axes of the gears and lie in a plane 55 which contains the mean pitch point P. This point is along the line of intersection of plane 55 with the pitch plane, 56, the two planes intersecting at the pressure angle $\phi$.

Figure 8:
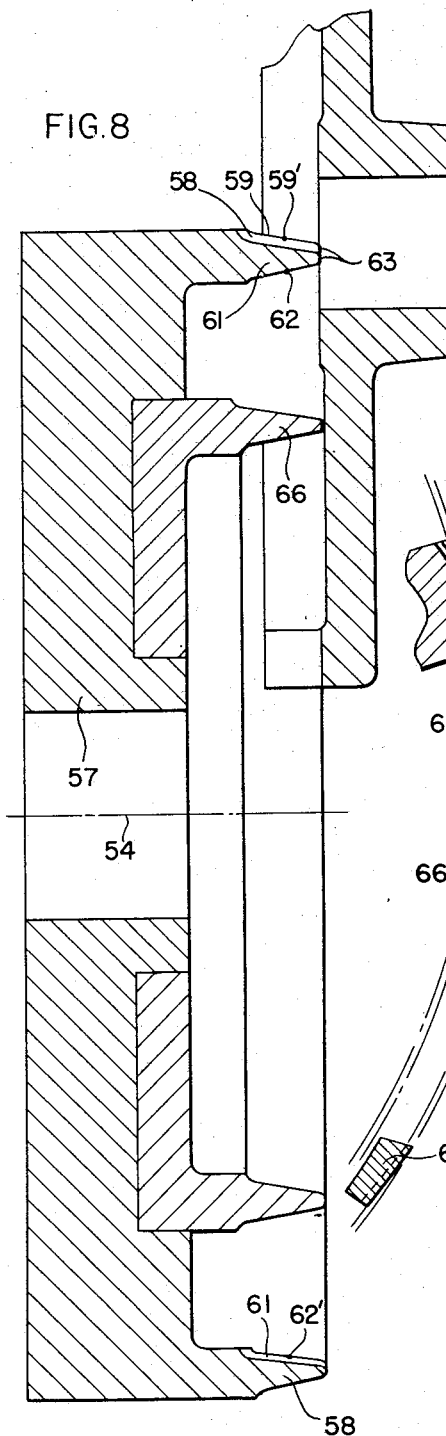
Fig. 8 is an axial section through the gear and cutter shown in Fig. 7.
Figure 7:
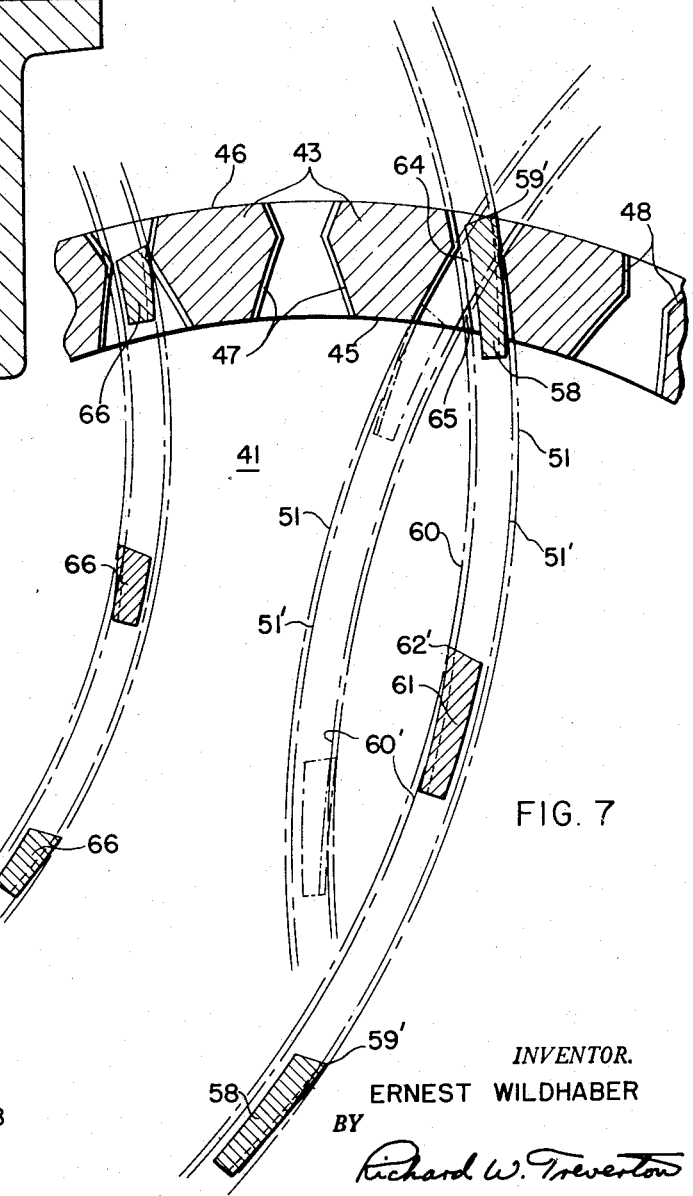
Fig. 7 is a fragmentary transverse section on an enlarged scale through one member of the gear pair shown in Fig. 5, and the cutter used for producing it.

The gear tooth faces 48 (and the corresponding faces of the pinion 42) may be produced simultaneously with the cutting of the working faces and with the same rotating cutter, this being illustrated in Figs. 7 and 8. Here the cutter 57 is one shaped to produce tapered teeth such as are shown in Fig. 3. The cutter has axially extending outside cutting blades 58 with side cutting edges 59 containing points 59' which trace the circular path 51 shown in Fig. 7. The tip points of the side cutting edges 59 trace the circular path 51'. The cutter also has inside cutting blades 61 with cutting edges 62 containing points 62' which trace the circular path 60, these edges 62 producing the conical surfaces 48. The tip points of the side cutting edges 62 trace circular path 60'.

It will be understood that the cutter operates in each tooth space twice during the cutting of a gear, once for producing the working face at each side of the space. There is an overlap of the two sweeps of the tip cutting edges 63 of blades 58 and 61, as is shown by the diamond shaped area 64 formed by the two circular paths 51' and the two circular paths 60'. However the widths of the blades must be so limited as to enable the blades to pass through the tooth spaces at their narrowest points, and hence this overlap may be insufficient in some instances to remove a fin 65. To cut away this fin auxiliary cutting blades 66 are provided on the cutter 57, these blades being arranged in a circle concentric with the cutter axis 54 to act in tooth spaces other than those in which blades 58 and 61 are cutting. To the extent that the auxiliary blades remove stock in advance of blades 58 and 61, they constitute roughing blades which reduce the cutting load borne by blades 58 and 61. In effect the blades 66 and their support constitutes a separate cutter from that which contains blades 58 and 61, and it is not essential that the cutters be used simultaneously or that they rotate at the same speed. However as a practical matter the two cutters preferably are made to rotate as a single unit, at least for roughing or finishing from the solid.

The radii of the cutters for producing the gears 41 and 42 may be determined from formulae derived by a procedure that is essentially the same as that described in detail in my aforementioned Patent No. 2,230,418. The formulae are:

$$C_G = \frac{3R \sin \phi}{2-\frac{R}{r}}$$

and $$C_P = \frac{3r \sin \phi}{2-\frac{r}{R}}$$

where $C_G$ is the mean effective radius of the cutter for the internal mesh gear teeth and $C_P$ the corresponding radius for the pinion cutter; R and r the respective pitch radii of the internal gear and the pinion; and $\phi$ the pressure angle. It will be seen that the value of $C_G$ is negative, indicating that the working faces of the teeth are produced by an inside cutting profile, whenever the gear-to-pinion tooth number ratio is greater than 2.

As in the case of external gear pairs the cutter radii may be varied to enable each cutter to be symmetrically disposed relative to both of the teeth which it cuts simultaneously. However greater latitude in this respect is permissible in the case of internal gear pairs, without noticeably affecting the ability of the gears to transmit motion at uniform velocity ratio.

In Figs. 5, 6 and 7 the pitch point P is disposed at the mean point along the length of the tooth profiles: the teeth have standard proportions, with equal addendum and dedendum. However I have discovered that for internal gears of given profile length and pressure angle, gear pairs more nearly approaching 1:1 tooth number ratio can be produced without encountering internal interference by making the gear addendum longer.

Figure 9:
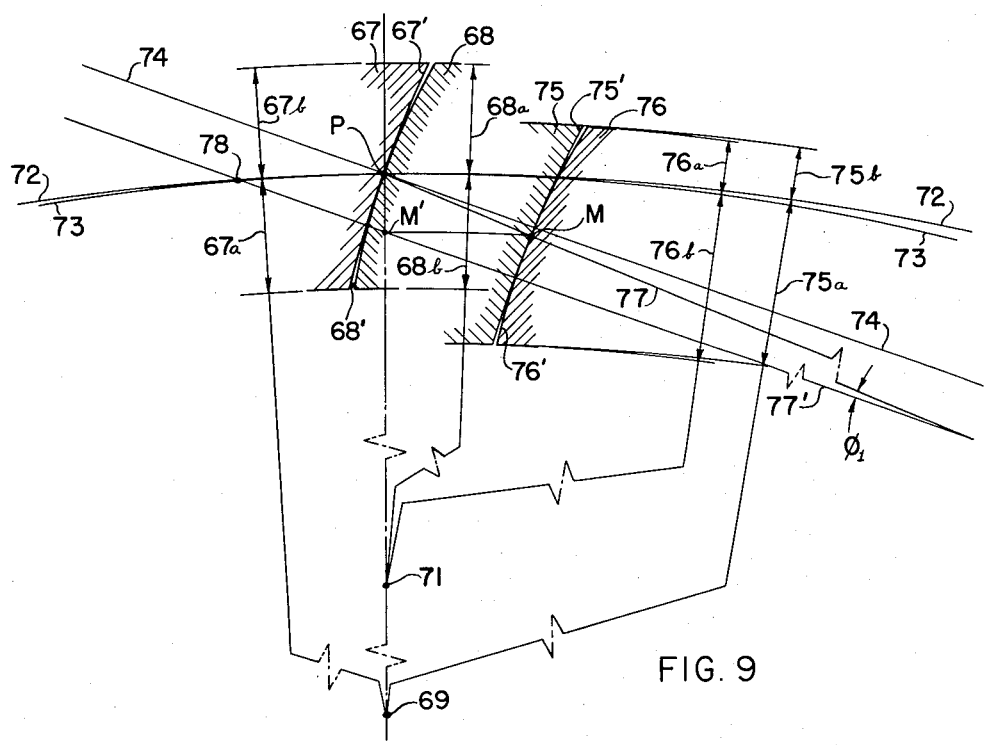
Fig. 9 is a diagram showing modified tooth proportions for preventing internal interference and other purposes.

One way in which this may be accomplished is shown in Fig. 9. Here is shown an internal mesh gear tooth 67 and a mating pinion tooth 68, these teeth being of standard proportions with their respective addenda 67a and 68a equal and also equal to their respective dedenda 67b and 68b. The addenda and dedenda measurements are made along radii from the respective centers 69 and 71 of the gear and pinion, these radii being greatly foreshortened in the drawing. The respective pitch circles 72 and 73 of the gear and pinion intersect the line of centers 69—71 at pitch point P, and through the latter also passes tooth normal 74 along which the centers of curvature of the circular arc tooth profiles 67' and 68' are disposed.

The mating gear and pinion teeth 75 and 76 in Fig. 9 have the same pitch circles 72 and 73 and the same pitch point P, but their proportions have been changed so that their respective addendum and dedendum 75a and 76b, are longer than their dedendum 75b and addendum 76a (three times as long in this particular illustration). The mean point M along these profiles is first considered as being at M', along the line of centers 69 and 71. Through M' passes the new tooth normal (i. e. the normal for the teeth with modified proportions) which in this position is parallel to the normal 74 and is designated 77', the latter intersecting the pitch circle 72 at point 78.

When the mean point and the new tooth normal are rotated about center 69 through an angle $\phi_1$ (the same as angle 78, 69, P) they reach the position shown at M and 77. In this position M is the point of contact of profiles 75' and 76' and normal 77 intersects the pitch point P. The distances from P along line 77 of the centers of curvature of the profiles 75' and 76' may have the values $C_G$ and $C_P$, determined by the formulae given hereinbefore, taking into account that the pressure angle $\phi$ has now been increased by the angle $\phi_1$. The change of tooth proportion may be carried to any desired degree, but preferably only far enough to provide necessary clearance between the teeth that are approaching and departing from contact (at points such as that designated 79 in Fig. 5), or to provide clearance for other purposes such as that referred to hereinafter.

Referring now to the gear reduction unit shown in Figs. 10 and 11, the housing 80 has suitable bearings 81 and 82 for supporting a drive shaft 83 against radial and axial loads. The housing also has bearing means (not shown) for similarly supporting a driven internal gear 84, in coaxial relation with the drive member 83, about the common axis being designated O. The drive member has an eccentric 85 whose axis is designated O' and upon this eccentric is mounted the inner race of a single row ball bearing 86, the outer race of the bearing being secured to a planet gear 87 having pinion teeth 88 meshing at mean pitch point P with the driven gear 84. The planet gear also has another set of pinion teeth 89, meshing at mean pitch point P' with a stationary internal gear 91 that is secured to the housing 80 and is coaxial with the driven gear. The gears are of the kind shown in Figs. 5 and 6 with axially tapered teeth as shown in Fig. 3, the planet gear being made of an outer ring part, containing teeth 89, that is secured by welding or otherwise to a central web or disc part that contains teeth 88, the juncture of the two parts being indicated by dotted lines 92. To bear axial thrusts imposed on the planet gear by reason of the tapered teeth, there is provided, in addition to the anti-friction bearing 86, a race 93 upon which the beveled periphery of the planet gear rolls. The effective mean diameter of the beveled surface of the planet gear preferably is approximately equal to pitch diameter of the planet gear. Similarly the effective mean diameter of the race 93 preferably is approximately equal to the pitch diameter of the stationary internal gear 91, so that there is a true rolling action between the planet gear and the race. For counter-balancing the eccentric load of the planet gear 87, bearing 86 and eccentric 85, a counterweight 94 is secured to the drive shaft 83.

The reduction ratio of the unit is readily determined by the formula:

$$m = \frac{r_1}{r_1 - r_2} \cdot \frac{(r_2 + e)}{e}$$

where $m$ is the reduction ratio, $r_1$ and $r_2$ are respectively the pitch radii of the outer row of the teeth 89 and the inner row of teeth 88 of the planet gear, and $e$ is the offset of eccentric axis O' from axis O. Thus in an example with the proportions shown in Figs. 10 and 11, with tooth number ratio of the outer pair of gears of 65/60 and of the inner pair of 50/45, with both pairs having the same diametral pitch, a ratio of 40:1 is obtained, as follows (considering each quantity of the formula, except $m$, to be multiplied by twice the diametral pitch):

$$e = 65 - 60 \quad \text{or} \quad 50 - 45 = 5$$

$$m = \frac{60}{60 - 45} \cdot \frac{45 + 5}{5} = \frac{40}{1}$$

As will be seen from Fig. 10 the form of the gears enables a very compact arrangement, and especttially a very short overall axial dimension. Moreover the mean pitch points P' and P lie in the same transverse plane with the center of the bearing 86, and this, together with the provision of the race 93, make the axial load on the bearing very light. The planet is securely held at the outside in all directions, by the gear teeth and by race 93, and there are no tilting moments. A single bearing 86 is thus sufficient.

From Fig. 10 it will be seen that a possible design limitation may be interference between the outer ends of the teeth of driven gear 84 and the inner ends of teeth 89 of the planet gear. Such interference may be avoided in some cases by changing the proportions of the teeth of the driven gear in the manner referred to in connection with Fig. 9, which will decrease the outside diameter of the gear.

It will be understood that the gears and gearing shown and described herein have been disclosed by way of preferred example, to illustrate and explain the inventive principles involved, and that these principles may be otherwise embodied and utilized without departing from the spirit of my invention or the scope of the appended claims.

I claim:

1. A gear drive comprising an eccentric and a gear rotatable on a common axis, a stationary gear concentric with said axis, and a planet gear rotatable on the eccentric having two sets of teeth, meshing respectively with the aforementioned gears, the teeth of all of said gears lying in substantially the same plane perpendicular to said axis.

2. A gear drive according to claim 1 in which the teeth of both of said sets extend axially in the same direction from the body of the eccentric gear.

3. A gear drive according to claim 2 in which the sets of teeth of the several gears all have different pitch diameters, and the inter-tooth spaces of at least the sets that are of intermediate diameter are open at both radial ends thereof.

4. A gear drive according to claim 2 in which there is a mass balance on said driven member extending into the space between the sets of teeth of the outermost mating gear pair, on the side of the common axis diametrically opposite to the eccentric axis.

5. A gear drive according to claim 3 in which the effective diameter of the race is approximately the same as the pitch diameter of the stationary gear.

6. A gear drive comprising an eccentric and a gear rotatable on a common axis, a stationary gear concentric with said axis, a planet gear rotatable on the eccentric about an axis parallel to said common axis and having two sets of teeth, one set meshing with the rotatable gear and the other set meshing with the stationary gear, the teeth of at least one mating pair of said gears being tapered whereby drive loads on the said pair of gears produce an axial thrust load on the planet gear, and a stationary race concentric with the stationary gear and with which the planet gear has rolling contact for bearing said axial thrust load.

7. A gear drive according to claim 6 in which the working tooth faces of said mating gear pair are circular conical surfaces whose axes are parallel with said common axis.

8. A gear drive comprising an eccentric and a gear rotatable on a common axis, a stationary gear concentric with said axis, a planet gear rotatable on the eccentric about an axis parallel to said common axis and meshing with both aforementioned gears, the teeth of the stationary gear and the planet gear being tapered from end to end whereby drive loads on the gears produce an axial thrust load on the planet gear, and a stationary race concentric with the stationary gear and with which the planet gear has rolling contact for bearing said axial thrust load.

9. A pair of gears each of which has its teeth extending from its body in an axial direction and whose tooth spaces are open at both radial ends thereof, the working faces of the teeth being surfaces of revolution whose axes are parallel to the gear axes, the axis of the working faces on the opposite sides of each tooth being spaced from each other.

10. A pair of gears according to claim 9 wherein the opposite working faces of spaced teeth of each gear are parts of the same surface of revolution.

11. A pair of gears according to claim 9 wherein said surfaces of revolution are circular cones.

12. A pair of gears according to claim 10 wherein said surface of revolution is a circular cone.

13. A pair of gears according to claim 9 wherein one gear is an internal mesh gear whose teeth have concave working faces and the mate gear is an external gear whose teeth have convex working faces.

14. A pair of gears according to claim 13 wherein the opposite working faces of spaced teeth are parts of the same surface of revolution.

15. A pair of gears according to claim 13 wherein said surfaces of revolution are circular cones.

16. A pair of gears according to claim 13 wherein the ratio of pitch diameter of the internal mesh gear to the pitch diameter of the mate gear is less than the ratio of their respective radii of curvature.

17. A pair of gears according to claim 9 wherein, with mating teeth contacting at the pitch line, the axes of their respective surfaces of revolution lie in the same plane with said pitch line and are disposed on the same side of, but at different distances from, said pitch line.

18. A gear having teeth extending axially from the body thereof, the tooth spaces being open at both radial ends thereof, and the working faces of the teeth being surfaces of revolution whose axes are parallel to the gear axis, the axes of the working faces on the opposite sides of each tooth being spaced from each other.

19. A gear according to claim 18 in which opposite working faces of spaced teeth are parts of the same surface of revolution.

20. A gear according to claim 18 in which said surfaces of revolution are cones.

21. A gear according to claim 18 in which the teeth are hexagonal in transverse section, the side of each tooth comprising a working face and an adjacent face that is disposed at an obtuse angle to the working face.

22. A gear according to claim 21 in which said adjacent face is a surface of revolution coaxial with the working face on the opposite side of the contiguous tooth space.

23. A gear drive according to claim 3 in which the planet gear has two sets of teeth, one for meshing with the rotatable gear and the other for meshing with the stationary gear, in which the gear addendum is longer than the pinion addendum on at least one set of the two mating sets of teeth.

24. A pair of gears comprising an internal mesh gear and a mating pinion, the tooth number ratio of said pair being smaller than 2, and the gear addendum being longer than the pinion addendum.

25. A pair of gears according to claim 24 in which the profiles of the teeth of both members of the pair are circular arcs.

26. A pair of gears according to claim 10 in which the axes of said surfaces of revolution of contacting teeth in a mean position of contact are disposed in a common plane which contains the pitch point of the gears and is inclined to the pitch plane of the gears by the pressure angle of the teeth.

27. A pair of external gears according to claim 26 in which $C_G$ and $C_P$ are approximately equal to, and $$\left(\frac{1}{C_G}+\frac{1}{C_P}\right)$$

is approximately equal to and not less than, the values thereof determined by the formulae:

$$C_G=\frac{3r \sin \phi}{2\frac{r}{R}+1}$$

and $$C_P=\frac{3r \sin \phi}{2+\frac{r}{R}}$$

where $C_G$ and $C_P$ are the respective distances of the axes of the working faces of the gear and pinion members from the pitch point in such mean position of contact; $R$ and $r$ are the respective pitch radii of said members, and $\phi$ is the pressure angle of the teeth.

28. A pair of internal-external gears according to claim 26 in which $C_G$ and $C_P$ are approximately equal to, and $$\left(\frac{1}{C_G}+\frac{1}{C_P}\right)$$

is approximately equal to and not less than, the values thereof determined by the formulae:

$$C_G+\frac{3R \sin \phi}{2-\frac{R}{r}}$$

and $$C_P=\frac{3r \sin \phi}{2-\frac{r}{R}}$$

where $C_G$ and $C_P$ are the respective distances of the axes of the working faces of the internal and external members from the pitch point in such mean position of contact; R and r are the respective pitch radii of said members, and $\phi$ is the pressure angle of the teeth.

References Cited in the file of this patent

UNITED STATES PATENTS

| | | |
|---|---|---|
| 595,076 | Regan | Dec. 7, 1897 |
| 1,192,627 | Hatlee | July 25, 1916 |
| 1,755,102 | Croft | Apr. 15, 1930 |
| 1,818,554 | Head | Aug. 11, 1931 |
| 2,212,321 | Lacharite | Aug. 30, 1940 |
| 2,250,259 | Foote | July 22, 1941 |
| 2,463,725 | Stonebraker | Mar. 8, 1949 |
| 2,580,392 | Bade | Jan. 1, 1952 |

FOREIGN PATENTS

| | | |
|---|---|---|
| 613,071 | France | Nov. 8, 1926 |